US007776946B2

(12) United States Patent
Hintzer et al.

(10) Patent No.: US 7,776,946 B2
(45) Date of Patent: *Aug. 17, 2010

(54) AQUEOUS EMULSION POLYMERIZATION OF FLUORINATED MONOMERS USING A FLUORINATED SURFACTANT

(75) Inventors: Klaus Hintzer, Kastl (DE); Harald Kaspar, Burgkirchen (DE); Andreas R. Maurer, Langenneufnach (DE); Werner Schwertfeger, Altoetting (DE); Tilman Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 362 days.

This patent is subject to a terminal disclaimer.

(21) Appl. No.: 11/457,502

(22) Filed: Jul. 14, 2006

(65) Prior Publication Data

US 2007/0015866 A1    Jan. 18, 2007

(30) Foreign Application Priority Data

Jul. 15, 2005 (GB) ................................. 0514398.7

(51) Int. Cl.
 *C08K 5/09* (2006.01)
(52) U.S. Cl. ...................... 524/319; 524/544; 524/545; 524/546; 524/805; 427/180; 526/214; 526/242
(58) Field of Classification Search ................. 524/544; 525/178, 426; 526/72, 242
See application file for complete search history.

(56) References Cited

U.S. PATENT DOCUMENTS

| 2,713,593 | A | 7/1955 | Brice et al. |
|---|---|---|---|
| 3,037,953 | A | 6/1962 | Marks et al. |
| 3,142,665 | A | 7/1964 | Cardinal et al. |
| 3,179,614 | A | 4/1965 | Edwards |
| 3,260,691 | A | 7/1966 | Lavin et al. |
| 3,271,341 | A | 9/1966 | Garrison |
| 3,315,201 | A | 4/1967 | Werme |
| 3,345,317 | A | 10/1967 | Hoashi |
| 3,391,099 | A | 7/1968 | Punderson |
| 3,451,908 | A | 6/1969 | Sianesi et al. |
| 3,489,595 | A | 1/1970 | Brown, Jr. |
| 3,555,100 | A | 1/1971 | Garth et al. |
| 3,635,926 | A | 1/1972 | Gresham |
| 3,642,742 | A | 2/1972 | Carlson |
| 3,721,696 | A | 3/1973 | Sianesi et al. |
| 3,790,403 | A | 2/1974 | Ribbans, III |
| 3,855,191 | A | 12/1974 | Doughty, Jr. et al. |
| 3,882,153 | A | 5/1975 | Seki et al. |
| 3,981,945 | A | 9/1976 | Attwood et al. |
| 4,016,345 | A | 4/1977 | Holmes |
| 4,025,709 | A | 5/1977 | Blaise et al. |
| 4,049,863 | A | 9/1977 | Vassiliou |
| 4,123,401 | A | 10/1978 | Berghmans et al. |
| 4,131,711 | A | 12/1978 | Attwood |
| 4,252,859 | A | 2/1981 | Concannon et al. |
| 4,262,101 | A | 4/1981 | Hartwimmer et al. |
| 4,282,162 | A | 8/1981 | Kuhls |
| 4,287,112 | A | 9/1981 | Berghmans |
| 4,292,402 | A | 9/1981 | Pollet et al. |
| 4,342,825 | A | 8/1982 | Van Poucke et al. |
| 4,353,950 | A | 10/1982 | Vassiliou |
| 4,369,266 | A | 1/1983 | Kuhls et al. |
| 4,380,618 | A | 4/1983 | Khan et al. |
| 4,381,384 | A | 4/1983 | Khan |
| 4,391,940 | A | 7/1983 | Kuhls et al. |
| 4,425,448 | A | 1/1984 | Concannon et al. |
| 4,439,385 | A | 3/1984 | Kuhls et al. |
| 4,544,458 | A | 10/1985 | Grot et al. |
| 4,548,986 | A | 10/1985 | Suzuki et al. |
| 4,552,925 | A | 11/1985 | Nakagawa et al. |
| 4,588,796 | A | 5/1986 | Wheland |
| 4,618,641 | A | 10/1986 | Hengel |
| 4,621,116 | A | 11/1986 | Morgan |
| 4,623,487 | A | 11/1986 | Cope |
| 4,766,190 | A | 8/1988 | Morita et al. |
| 4,789,717 | A | 12/1988 | Giannetti et al. |
| 4,832,879 | A | 5/1989 | Hamprecht |

(Continued)

FOREIGN PATENT DOCUMENTS

CA      2354138       6/2000

(Continued)

OTHER PUBLICATIONS

"Guide to Protein Purification, Methods in Enzymology," Deutscher, M. vol. 182, 24, 1990. (pp. 309-317).
"High Performance Polymers for Diverse Applications." Modern Fluoropolymers. Edited by John Scheirs. John Wiley & Sons, 1997.
"Hydrogen-Ion Activity to Laminated Materials, Glass," Encyclopedia of Chemical Technology. John Wiley & Sons, vol. 13, $3^{rd}$ Ed. 1981. (p. 687).
"Immobilized Biocatalysts to Isoprene," Ullmann's Encyclopedia of Industrial Chemistry. vol. A14. 1985. (p. 439-459).
"Identification to Lignin," Encyclopedia of Polymer Science and Engineering. John Wiley & Sons, vol. 8. 1987 (p. 347).
"Nonionic Surfactants." Edited by Martin J. Schick, 1967.

(Continued)

*Primary Examiner*—Mark Eashoo
*Assistant Examiner*—Nicole M Buie-Hatcher
(74) *Attorney, Agent, or Firm*—Julie A. Lapos-Kuchar; Brian E. Szymanski

(57) ABSTRACT

The present invention provides an aqueous emulsion polymerization of fluorinated monomers including gaseous fluorinated monomers using a perfluoro ether surfactant as an emulsifier. The perfluoro ether surfactants correspond to formula (I)

$$R_f\text{—}O\text{—}CF_2CF_2\text{—}X \qquad (I)$$

wherein $R_f$ represents a linear or branched perfluoroalkyl group having 1, 2, 3 or 4 carbon atoms and X represents a carboxylic acid group or salt thereof. In a further aspect, the invention also provides an aqueous fluoropolymer dispersion comprising the perfluoro ether surfactant and the use of such dispersion in the coating or impregnation of substrates.

13 Claims, No Drawings

U.S. PATENT DOCUMENTS

| | | |
|---|---|---|
| 4,861,845 A | 8/1989 | Slocum et al. |
| 4,864,006 A | 9/1989 | Giannetti et al. |
| 4,987,254 A | 1/1991 | Schwertfeger et al. |
| 5,075,397 A | 12/1991 | Tonelli et al. |
| 5,153,322 A | 10/1992 | Flynn |
| 5,160,791 A | 11/1992 | Tannenbaum |
| 5,168,107 A | 12/1992 | Tannenbaum |
| 5,182,342 A | 1/1993 | Feiring et al. |
| 5,198,491 A | 3/1993 | Honda et al. |
| 5,219,910 A | 6/1993 | Stahl et al. |
| 5,223,343 A | 6/1993 | Tannenbaum |
| 5,229,480 A | 7/1993 | Uschold |
| 5,230,961 A | 7/1993 | Tannenbaum |
| 5,272,186 A | 12/1993 | Jones |
| 5,285,002 A | 2/1994 | Grootaert |
| 5,312,935 A | 5/1994 | Mayer et al. |
| 5,442,097 A | 8/1995 | Obermeier et al. |
| 5,447,982 A | 9/1995 | Kamba et al. |
| 5,453,477 A | 9/1995 | Oxenrider et al. |
| 5,463,021 A | 10/1995 | Beyer et al. |
| 5,478,651 A | 12/1995 | Tannenbaum |
| 5,488,142 A | 1/1996 | Fall et al. |
| 5,498,680 A | 3/1996 | Abusleme et al. |
| 5,530,078 A | 6/1996 | Felix et al. |
| 5,532,310 A | 7/1996 | Grenfell et al. |
| 5,562,991 A | 10/1996 | Tannenbaum |
| 5,576,381 A | 11/1996 | Bladel et al. |
| 5,591,877 A | 1/1997 | Obermeier et al. |
| 5,608,022 A | 3/1997 | Nakayama et al. |
| 5,656,201 A | 8/1997 | Visca et al. |
| 5,663,255 A | 9/1997 | Anolick et al. |
| 5,667,846 A | 9/1997 | Thomas |
| 5,688,884 A | 11/1997 | Baker et al. |
| 5,700,859 A | 12/1997 | Ogura et al. |
| 5,710,345 A | 1/1998 | Navarrini et al. |
| 5,721,053 A | 2/1998 | Thomas |
| 5,763,552 A | 6/1998 | Feiring et al. |
| 5,789,083 A | 8/1998 | Thomas |
| 5,789,508 A | 8/1998 | Baker et al. |
| 5,804,650 A | 9/1998 | Tsuda et al. |
| 5,895,799 A | 4/1999 | Wu et al. |
| 5,955,556 A | 9/1999 | McCarthy et al. |
| 5,959,026 A | 9/1999 | Abusleme et al. |
| 5,969,063 A | 10/1999 | Parker et al. |
| 5,990,330 A | 11/1999 | Sulzbach et al. |
| 6,013,795 A | 1/2000 | Manzara et al. |
| 6,025,307 A | 2/2000 | Chittofrati et al. |
| 6,103,843 A | 8/2000 | Abusleme et al. |
| 6,103,844 A | 8/2000 | Brothers |
| 6,126,849 A | 10/2000 | Yamana et al. |
| 6,136,893 A | 10/2000 | Yamashita et al. |
| 6,153,688 A | 11/2000 | Miura et al. |
| 6,218,464 B1 | 4/2001 | Parker et al. |
| 6,245,923 B1 | 6/2001 | Sulzbach et al. |
| 6,255,384 B1 | 7/2001 | McCarthy et al. |
| 6,255,536 B1 | 7/2001 | Worm et al. |
| 6,267,865 B1 | 7/2001 | Polson et al. |
| 6,365,684 B1 | 4/2002 | McCarthy et al. |
| 6,391,182 B2 | 5/2002 | Smeltzer et al. |
| 6,395,848 B1 | 5/2002 | Morgan et al. |
| 6,410,626 B1 | 6/2002 | Wada et al. |
| 6,429,258 B1 | 8/2002 | Morgan et al. |
| 6,436,244 B1 | 8/2002 | Fuhrer et al. |
| 6,482,979 B1 | 11/2002 | Hintzer et al. |
| 6,512,063 B2 | 1/2003 | Tang |
| 6,518,442 B1 | 2/2003 | Felix et al. |
| 6,576,703 B2 | 6/2003 | Kapeliouchko et al. |
| 6,593,416 B2 | 7/2003 | Grootaert et al. |
| 6,602,968 B1 | 8/2003 | Bekiarian et al. |
| 6,610,788 B1 | 8/2003 | Takakura et al. |
| 6,613,941 B1 | 9/2003 | Felix et al. |
| 6,624,268 B1 | 9/2003 | Maekawa et al. |
| 6,632,508 B1 | 10/2003 | Pellerite et al. |
| 6,642,307 B1 | 11/2003 | Sogabe et al. |
| 6,642,415 B1 | 11/2003 | Fuhrer et al. |
| 6,660,798 B1 | 12/2003 | Marchese et al. |
| 6,677,414 B2 | 1/2004 | Hintzer et al. |
| 6,689,854 B2 * | 2/2004 | Fan et al. ............... 526/243 |
| 6,693,152 B2 | 2/2004 | Kaspar et al. |
| 6,703,520 B2 | 3/2004 | Hintzer et al. |
| 6,706,193 B1 | 3/2004 | Burkard et al. |
| 6,710,123 B1 | 3/2004 | Amin-Sanayei et al. |
| 6,737,489 B2 | 5/2004 | Linert et al. |
| 6,750,304 B2 | 6/2004 | Kaspar et al. |
| 6,761,964 B2 | 7/2004 | Tannenbaum |
| 6,774,164 B2 | 8/2004 | Lyons et al. |
| 6,794,550 B2 | 9/2004 | Hintzer et al. |
| 6,815,040 B2 | 11/2004 | Pellerite et al. |
| 6,822,059 B2 | 11/2004 | Buckanin et al. |
| 6,825,250 B2 | 11/2004 | Epsch et al. |
| 6,833,403 B1 | 12/2004 | Baldel et al. |
| 6,846,570 B2 | 1/2005 | Leech et al. |
| 6,861,466 B2 | 3/2005 | Dadalas et al. |
| 6,861,490 B2 | 3/2005 | Kaspar et al. |
| 6,869,997 B2 | 3/2005 | Wille et al. |
| 6,878,772 B2 | 4/2005 | Visca et al. |
| 6,956,078 B2 | 10/2005 | Cavanaugh et al. |
| 6,972,094 B2 | 12/2005 | Ichida et al. |
| 7,026,036 B2 | 4/2006 | Leech et al. |
| 7,041,728 B2 | 5/2006 | Zipplies et al. |
| 7,045,571 B2 | 5/2006 | Tan et al. |
| 7,064,170 B2 | 6/2006 | Kaspar et al. |
| 7,074,862 B2 | 7/2006 | Kaspar et al. |
| 7,122,608 B1 | 10/2006 | Brinati et al. |
| 7,125,941 B2 | 10/2006 | Kaulbach et al. |
| 7,126,016 B2 | 10/2006 | Fu et al. |
| 7,141,620 B2 | 11/2006 | Hoshikawa et al. |
| 2002/0198345 A1 * | 12/2002 | Grootaert et al. ............ 526/247 |
| 2003/0125421 A1 | 7/2003 | Bladel et al. |
| 2003/0181572 A1 * | 9/2003 | Tan et al. ............... 524/502 |
| 2004/0010156 A1 | 1/2004 | Kondo et al. |
| 2004/0116742 A1 | 6/2004 | Guerra |
| 2004/0143052 A1 | 7/2004 | Epsch et al. |
| 2004/0186219 A1 | 9/2004 | Dadalas et al. |
| 2004/0242755 A1 | 12/2004 | Araki et al. |
| 2005/0043471 A1 | 2/2005 | Epsch et al. |
| 2005/0070633 A1 | 3/2005 | Epsch et al. |
| 2005/0090601 A1 | 4/2005 | Dadalas et al. |
| 2005/0090613 A1 | 4/2005 | Maruya et al. |
| 2005/0107506 A1 | 5/2005 | Kapeliouchko et al. |
| 2005/0113519 A1 | 5/2005 | Buckanin et al. |
| 2005/0154104 A1 | 7/2005 | Malvasi et al. |
| 2005/0228127 A1 | 10/2005 | Tatemoto et al. |
| 2006/0003168 A1 | 1/2006 | Dadalas et al. |
| 2006/0041051 A1 | 2/2006 | Nakatani et al. |
| 2006/0160947 A1 | 7/2006 | Tan et al. |
| 2006/0281946 A1 | 12/2006 | Morita et al. |
| 2007/0015864 A1 | 1/2007 | Hintzer et al. |
| 2007/0025902 A1 | 2/2007 | Hintzer et al. |
| 2007/0082993 A1 | 4/2007 | Amin-Sanayei et al. |
| 2007/0117915 A1 | 5/2007 | Funaki et al. |
| 2007/0135558 A1 | 6/2007 | Tsuda et al. |
| 2007/0149733 A1 | 6/2007 | Otsuka et al. |
| 2007/0155891 A1 | 7/2007 | Tsuda et al. |
| 2007/0276103 A1 * | 11/2007 | Guerra et al. ............ 526/144 |

FOREIGN PATENT DOCUMENTS

| | | |
|---|---|---|
| DE | 3828063 | 2/1990 |
| DE | 19932771 | 1/2001 |
| DE | 19933696 | 1/2001 |
| DE | 10018853 | 10/2001 |
| EP | 0014431 | 8/1980 |
| EP | 0015481 | 9/1980 |

| | | |
|---|---|---|
| EP | 0022257 | 1/1981 |
| EP | 0222945 | 11/1984 |
| EP | 0219065 | 4/1987 |
| EP | 0 519 406 | 12/1992 |
| EP | 0524585 | 1/1993 |
| EP | 0525660 | 2/1993 |
| EP | 0612770 | 8/1994 |
| EP | 0625526 | 11/1994 |
| EP | 0632009 | 1/1995 |
| EP | 0649863 | 4/1995 |
| EP | 0712882 | 5/1996 |
| EP | 0718364 | 6/1996 |
| EP | 0739960 | 10/1996 |
| EP | 0752432 | 1/1997 |
| EP | 0816397 | 1/1998 |
| EP | 0818506 | 1/1998 |
| EP | 0890592 B1 | 1/1999 |
| EP | 0894541 | 2/1999 |
| EP | 0964009 | 12/1999 |
| EP | 0969027 | 1/2000 |
| EP | 1059333 | 12/2000 |
| EP | 1059342 | 12/2000 |
| EP | 1083441 | 3/2001 |
| EP | 1160258 | 12/2001 |
| EP | 1323677 | 7/2003 |
| EP | 1364972 | 11/2003 |
| EP | 1 334 996 | 3/2004 |
| EP | 1462461 | 9/2004 |
| EP | 1514848 | 4/2006 |
| GB | 642025 | 8/1950 |
| GB | 821353 | 10/1959 |
| GB | 966814 | 8/1964 |
| JP | 46011031 | 8/1966 |
| JP | 2000-128934 | 5/2000 |
| JP | 2002-179870 | 6/2002 |
| JP | 2002-308914 | 10/2002 |
| JP | 2002-317003 | 10/2002 |
| JP | 2003-043625 | 2/2003 |
| JP | 2003-119204 | 4/2003 |
| JP | 2003-212919 | 7/2003 |
| JP | 2004-358397 | 12/2004 |
| JP | 2004-359870 | 12/2004 |
| JP | 2005-008775 | 1/2005 |
| JP | 2005-0105045 | 4/2005 |
| RU | 2158274 | 10/2000 |
| WO | WO 94/14904 | 7/1994 |
| WO | WO96/24622 | 8/1996 |
| WO | WO 97/17381 | 5/1997 |
| WO | WO 98/50603 | 11/1998 |
| WO | WO 00/22002 | 4/2000 |
| WO | WO 00/35971 | 6/2000 |
| WO | WO 00/52060 | 9/2000 |
| WO | WO 00/71590 | 11/2000 |
| WO | WO 01/46116 | 6/2001 |
| WO | WO 01/79332 | 10/2001 |
| WO | WO 02/14223 | 2/2002 |
| WO | WO02/20676 | 3/2002 |
| WO | WO 02/078862 | 10/2002 |
| WO | WO 02/088203 | 11/2002 |
| WO | WO 02/088206 | 11/2002 |
| WO | WO 02/088207 | 11/2002 |
| WO | WO 02/095121 | 11/2002 |
| WO | WO 03/020836 | 3/2003 |
| WO | WO 03/051988 | 6/2003 |
| WO | WO 03/087176 | 10/2003 |
| WO | WO 03/087179 | 10/2003 |
| WO | WO 2004/031141 | 4/2004 |
| WO | WO 2004/067588 | 8/2004 |
| WO | WO 2005/003075 | 1/2005 |
| WO | WO2005/042593 | 5/2005 |
| WO | WO2005/056614 | 6/2005 |
| WO | WO2005/063827 | 7/2005 |
| WO | WO2005/065800 | 7/2005 |
| WO | WO 2005/082785 | 9/2005 |
| WO | WO2005/121290 | 12/2005 |
| WO | WO2006/011533 | 2/2006 |
| WO | WO2006/020721 | 2/2006 |
| WO | WO 2007/120348 | 10/2007 |

OTHER PUBLICATIONS

"Synthesis of Perfluoroalkyl Vinyl Ether Acids and Derivatives," Perfluoroalkyl Vinyl Ether Acids. Raymond Sullivan, vol. 34, No. 6, Jun. 1969. (p. 1841).
England, "Catalytic Conversion of Fluoroalkyl Alkyl Ethers to Carbonyl Compounds", J. Org. Chem., 1984, vol. 49, pp. 4007-4008.
Sudol et al., "Miniemulsion Polymerization", Emulsion Polymerization and Emulsion Polymers, John Wiley & Sons, 1997, Chapter 20.
Candau, "Inverse Emulsion and Microemulsion Polymerization", Emulsion Polymerization and Emulusion Polymers, John Wiley & Sons, 1997, Chapter 21.
Chi et al., "A Facile Synthesis of Partly-fluorinated Ethers Using Perfluroporpoxyethylene and Aliphatic Alcohols", Bull. Korean Chem. Soc., 1999, vol. 20, No. 2, pp. 220-222.
Ebnesajjad, "Fluoroplastics, Volume1, Non-Melt Processable Fluoroplastics", Plastics Design Library, NY, 2000, pp. 285-295.
Ebnesajjad, "Fluoroplastics, Volume 2, Melt Processable Fluoropolymers", Plastics Design Library, NY, 2003, pp. 1-21.
ASTM D 4895-04, "Standard Specification for Polytetrafluoroethylene (PTFE) Resin Produced From Dispersion", pp. 1-14, date unknown.
Storsberg, Joachim and Ritter, Helmut, "Cyclodextrins in Polymer Synthesis: A 'Green' Route to Fluorinated Polymers via Cyclodextrin Complexes in Aqueous Solution", *Macromol. Chem Phys.*, 2002, pp. 812-818.
Drobny, Technology of Fluoropolymers, CRC Press LLC, 2001, p. 35.
Kokelenberg, H. And Pollet, R., "A New type fluortensides, based on the addition of nucleophiles to chlorotrifluoroethylene and hexafluoropropylene." Tenside Detergents, 1985, 22(1), pp. 22-27.
Apostolo et al., "Microemulsion Polymerization for Producing Fluorinated Structured Materials", Macromol. Symp. 2004, 206, pp. 347-360.
Ivanova et al., "Synthesis of Alcohols from Perfluorvinyl Esters", Zh. Vses. Khim Obsh 1999, (24), pp. 656-657.
W.C. Griffin "Calculation of HLB Values of Non-Ionic Surfactants", Journal of Society of Cosmetic Chemists, vol. 5, (1954) p. 259.

\* cited by examiner

AQUEOUS EMULSION POLYMERIZATION OF FLUORINATED MONOMERS USING A FLUORINATED SURFACTANT

CROSS-REFERENCE TO RELATED APPLICATION

This application claims priority to Great Britain Patent Application No. GB0514398.7, filed on Jul. 15, 2005, herein incorporated by reference in its entirety.

The present invention relates to the aqueous emulsion polymerization of fluorinated monomers to produce fluoropolymers.

BACKGROUND OF THE INVENTION

Fluoropolymers, i.e. polymers having a fluorinated backbone, have been long known and have been used in a variety of applications because of several desirable properties such as heat resistance, chemical resistance, weatherability, UV-stability etc. The various fluoropolymers are for example described in "Modern Fluoropolymers", edited by John Scheirs, Wiley Science 1997. Commonly known or commercially employed fluoropolymers include polytetrafluoroethylene (PTFE), copolymers of tetrafluoroethylene (TFE) and hexafluoropropylene (HFP) (FEP polymers), perfluoroalkoxy copolymers (PFA), ethylene-tetrafluoroethylene (ETFE) copolymers, terpolymers of tetrafluoroethylene, hexafluoropropylene and vinylidene fluoride (THV) and polyvinylidene fluoride polymers (PVDF). Commercially employed fluoropolymers also include fluoroelastomers and thermoplastic fluoropolymers.

Several methods are known to produce fluoropolymers. Such methods include suspension polymerization as disclosed in e.g. U.S. Pat. No. 3,855,191, U.S. Pat. No. 4,439,385 and EP 649863; aqueous: emulsion polymerization as disclosed in e. g. U.S. Pat. No. 3,635,926 and U.S. Pat. No. 4,262,101; solution polymerization as disclosed in U.S. Pat. No. 3,642,742, U.S. Pat. No. 4,588,796 and U.S. Pat. No. 5,663,255; polymerization using supercritical $CO_2$ as disclosed in JP 46011031 and EP 964009 and polymerization in the gas phase as disclosed in U.S. Pat. No. 4,861,845.

Currently, the most commonly employed polymerization methods include suspension polymerization and especially aqueous emulsion polymerization. The aqueous emulsion polymerization normally involves the polymerization in the presence of a fluorinated surfactant, which is generally used for the stabilization of the polymer particles formed. The suspension polymerization generally does not involve the use of surfactant but results in substantially larger polymer particles than in case of the aqueous emulsion polymerization. Thus, the polymer particles in case of suspension polymerization will quickly settle out whereas in case of dispersions obtained in emulsion polymerization generally good stability over a long period of time is obtained.

An aqueous emulsion polymerization wherein no surfactant is used has been described in U.S. Pat. No. 5,453,477, WO 96/24622 and WO 97/17381 to generally produce homo- and copolymers of chlorotrifluoroethylene (CTFE). For example, WO 97/17381 discloses an aqueous emulsion polymerization in the absence of a surfactant wherein a radical initiator system of a reducing agent and oxidizing agent is used to initiate the polymerization and whereby the initiator system is added in one or more further charges during the polymerization. So-called emulsifier free polymerization has further been disclosed in WO 02/88206 and WO 02/88203. In the latter PCT application, the use of dimethyl ether or methyl tertiary butyl ether is taught to minimize formation of low molecular weight fractions that may be extractable from the fluoropolymer. WO 02/88207 teaches an emulsifier free polymerization using certain chain transfer agents to minimize formation of water soluble fluorinated compounds. An emulsifier free polymerization is further disclosed in RU 2158274 for making an elastomeric copolymer of hexafluoropropylene and vinylidene fluoride.

Notwithstanding the fact that emulsifier free polymerizations are known, the aqueous emulsion polymerization process in the presence of fluorinated surfactants is still a desirable process to produce fluoropolymers because it can yield stable fluoropolymer particle dispersions in high yield and in a more environmental friendly way than for example polymerizations conducted in an organic solvent. Frequently, the emulsion polymerization process is carried out using a perfluoroalkanoic acid or salt thereof as a surfactant. These surfactants are typically used as they provide a wide variety of desirable properties such as high speed of polymerization, good copolymerization properties of fluorinated olefins with comonomers, small particle sizes of the resulting dispersion can be achieved, good polymerization yields i.e. a high amount of solids can be produced, good dispersion stability, etc. However, environmental concerns have been raised against these surfactants and moreover these surfactants are generally expensive. In particular, perfluoro-alkanoic acids having 8 or more carbons are known to be bioaccumulating. Alternative surfactants to the perfluoroalkanoic acids or salts thereof have also been proposed in the art for conducting the emulsion polymerization of fluorinated monomers.

For example, surfactants of the general formula $R_f—C_2H_4—SO_3M$, wherein $R_f$ represents a perfluorinated aliphatic group and wherein M represents a cation, have been disclosed in U.S. Pat. No. 5,789,508, U.S. Pat. No. 4,025,709, U.S. Pat. No. 5,688,884 and U.S. Pat. No. 4,380,618.

U.S. Pat. No. 5,763,552 discloses partially fluorinated surfactants of the general formula $R_f—(CH_2)_m—R'_f—COOM$ wherein $R_f$ represents a perfluoroalkyl group or a perfluoroalkoxy group of 3 to 8 carbon atoms, $R'_f$ represents a perfluoroalkylene of 1 to 4 carbon atoms and m is 1-3.

U.S. Pat. No. 4,621,116 discloses perfluoroalkoxy benzene sulphonic acids and salts thereof in the aqueous emulsion polymerization of fluorinated monomers.

U.S. Pat. No. 3,271,341 teaches perfluoropolyethers of the general formula:

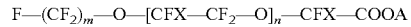

wherein m is 1 to 5, X is F or $CF_3$, A is a monovalent cation and n is 0 to 10. The perfluoropolyethers are taught as emulsifiers in the emulsion polymerization of ethylenically unsaturated monomers.

US Publication No. 2005/0090613 discloses fluorinated polyethers of the formula:

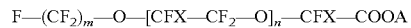

wherein m is 3 to 10, X is F or a perfluoroalkyl group, n is 0, 1 or 2 and A is the counter ion of the carboxylic anion. These polyethers are taught as emulsifiers in the emulsion polymerization of fluorinated olefins.

The use of perfluoropolyethers having neutral end groups in an aqueous emulsion polymerization is disclosed in U.S. Pat. No. 4,864,006, U.S. Pat. No. 4,789,717 and EP 625526. For example U.S. Pat. No. 4,864,006 and EP 625526 disclose the use of microemulsion prepared from perfluoropolyethers having neutral end groups in an aqueous emulsion polymerization of fluorinated monomers. In a particular embodiment, a certain perfluoropolyether having carboxylic end groups is taught to emulsify the neutral perfluoropolyether.

EP 1,334,996 discloses certain perfluoropolyethers having carboxylic acid groups or salts thereof at both end groups, i.e. the perfluoropolyethers are bifunctional. The perfluoropolyethers are taught for use in aqueous dispersions of fluoropolymers and in the preparation of such dispersion by aqueous emulsion polymerization.

WO 00/71590 teaches the use of a combination of perfluoropolyether surfactants having a carboxylic acid group or salt thereof with a fluoroalkyl carboxylic acid or sulphonic acid or salt thereof. It is taught that the perfluoropolyether surfactants on their own are not very powerful surfactants.

Still further, WO 05/03075 discloses certain fluorinated polyether surfactants for emulsion polymerization of fluorinated monomers.

SUMMARY OF THE INVENTION

It would now be desirable to find an alternative emulsion polymerization process in which the use of perfluoroalkanoic acids and salts thereof as a fluorinated surfactant can be avoided. In particular, it would be desirable to find an alternative surfactant or dispersant, in particular one that for example has a low toxicity and/or shows no or only little bioaccumulation. It would also be desirable that the alternative surfactant has good chemical and thermal stability enabling polymerization over a wide range of conditions of for example temperature and/or pressure. Desirably, the alternative surfactant or dispersant allows for a high polymerization rate, good dispersion stability, good yields, good copolymerization properties and/or the possibility of obtaining a wide variety of particle sizes including small particle sizes. The properties of the resulting fluoropolymer should generally not be negatively influenced and preferably would be improved. Desirably, the resulting dispersions have good or excellent properties in coating applications and/or impregnation of substrates, including for example good film forming properties. It would further be desirable that the polymerization can be carried out in a convenient and cost effective way, preferably using equipment commonly used in the aqueous emulsion polymerization of fluorinated monomers. Additionally, it may be desirable to recover the alternative surfactant or dispersant from waste water streams and/or to remove or recover the surfactant from the dispersion subsequent to the polymerization. Desirably, such recovery can proceed in an easy, convenient and cost effective way.

It has been found that perfluoro ethers of the following formula (I) are effective in the aqueous emulsion polymerization, even when used without the addition of other surfactants such as perfluoroalkanoic acids and salts thereof. In particular, the perfluoro ether surfactants correspond to formula (I)

wherein $R_f$ represents a linear or branched perfluoroalkyl group having 1, 2, 3 or 4 carbon atoms and X represents a carboxylic acid group or salt thereof Examples of carboxylic acid salts include sodium, potassium and ammonium ($NH_4$) salts. Perfluoro ether surfactants of formula (I) in which $R_f$ represents a perfluoroalkyl group selected from $CF_3$, $CF_3CF_2$, $CF_3CF_2CF_2$, $(CF_3)_2CF$ and $(CF_3)_3C$ are preferred as they may provide beneficial environmental properties. In particular perfluoro ethers of formula (I) in which $R_f$ is $CF_3$, $CF_3CF_2$ or $CF_3CF_2CF_2$ eliminate more quickly from a living organism, as demonstrated on rat screening studies, than perfluoro alkanoic acids having 8 or more carbon atoms.

Thus, in one aspect, the invention relates to a method for making a fluoropolymer comprising an aqueous emulsion polymerization of one or more fluorinated monomers wherein said aqueous emulsion polymerization is carried out in the presence of a perfluoro ether of formula (I) as an emulsifier.

In a further aspect, the invention relates to an aqueous dispersion of a fluoropolymer comprising a perfluoro ether of formula (I) as an emulsifier.

Since the aqueous emulsion polymerization can be carried out without the need for using a perfluoroalkanoic acid, dispersions can be readily obtained that are free of such perfluoroalkanoic acids or salts thereof. Thus, in a further aspect, the present invention relates to an aqueous dispersion of a fluoropolymer comprising perfluoro ether of formula (I) and wherein the aqueous dispersion is free of perfluoroalkanoic acid or salts thereof.

The resulting dispersions can be used in a variety of applications including coating and impregnation of substrates. Generally, a non-ionic surfactant should be added to the dispersion for such applications. Accordingly, the invention in a further aspect relates to aqueous dispersions of a fluoropolymer comprising a perfluoro ether of formula (I) as an emulsifier and additionally comprising a non-ionic surfactant, typically in an amount of 1 to 12% by weight based on the weight of fluoropolymer solids.

DETAILED DESCRIPTION OF THE INVENTION

The aqueous emulsion polymerization of fluorinated monomers, including gaseous fluorinated monomers, can be conducted using one or more perfluoro ether of formula (I) as emulsifier. Specific examples of suitable perfluoro ether surfactants according to formula (I) include:

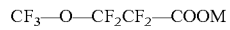

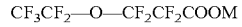

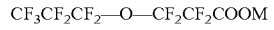

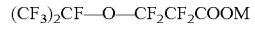

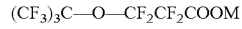

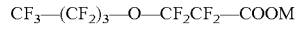

wherein M represents H, Na, K or $NH_4$.

The perfluoro ethers according to formula (I) can be synthesized starting from the corresponding perfluorinated acid fluorides, the preparation of which is described e.g. in WO 01/46116. To prepare a perfluoro ether of formula (I) in which X is a carboxylic acid, the corresponding perfluorinated acid fluorides is hydrolysed with water. Conversion of the acid to any salt may be accomplished by neutralization with an appropriate base. Alternatively, the perfluorinated acid fluoride may be reacted with an alcohol (e.g. methanol or ethanol) so as to result in the corresponding ester. This ester can then be distilled for further purification and finally be saponified to the desired salt.

In accordance with the present invention, the perfluoro ether surfactant of formula (I) is used in the aqueous emulsion polymerization of one or more fluorinated monomers, in particular gaseous fluorinated monomers. By gaseous fluorinated monomers is meant monomers that are present as a gas under the polymerization conditions. In a particular embodiment, the polymerization of the fluorinated monomers is started in the presence of the perfluoro ether surfactant, i.e. the polymerization is initiated in the presence of the perfluoro ether surfactant. The amount of perfluoro ether surfactant used may vary depending on desired properties such as amount of solids, particle size etc. Generally the amount of perfluoro ether surfactant will be between 0.01% by weight based on the weight of water in the polymerization and 5% by weight, for example between 0.05% by weight and 2% by weight. A practical range is between 0.05% by weight and 1% by weight. While the polymerization is generally initiated in the presence of the perfluoro ether surfactant, it is not excluded to add further perfluoro ether surfactant during the polymerization although such will generally not be necessary. It may further be desirable to add certain monomer to the polymerization in the form of an aqueous emulsion. For example, fluorinated monomers and in particular perfluorinated co-monomers that are liquid under the polymerization conditions may be advantageously added in the form of an aqueous emulsion. Such emulsion of such co-monomers is preferably prepared using the perfluoro ether as an emulsifier.

The aqueous emulsion polymerization may be carried out at temperatures between 10 to 100° C., preferably 30° C. to 80° C. and the pressure is typically between 2 and 30 bar, in particular 5 to 20 bar. The reaction temperature may be varied during the polymerization to influence the molecular weight distribution, i.e., to obtain a broad molecular weight distribution or to obtain a bimodal or multimodal molecular weight distribution.

The aqueous emulsion polymerization is typically initiated by an initiator including any of the initiators known for initiating a free radical polymerization of fluorinated monomers. Suitable initiators include peroxides and azo compounds and redox based initiators. Specific examples of peroxide initiators include, hydrogen peroxide, sodium or barium peroxide, diacylperoxides such as diacetylperoxide, disuccinyl peroxide, dipropionylperoxide, dibutyrylperoxide, dibenzoylperoxide, benzoylacetylperoxide, diglutaric acid peroxide and dilaurylperoxide, and further per-acids and salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. Examples of inorganic include for example ammonium-alkali- or earth alkali salts of persulfates, permanganic or manganic acid or manganic acids. A persulfate initiator, e.g. ammonium persulfate (APS), can be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (Rongalit®) or fluoroalkyl sulfinates as disclosed in U.S. Pat. No. 5,285,002. The reducing agent typically reduces the half-life time of the persulfate initiator. Additionally, a metal salt catalyst such as for example copper, iron or silver salts may be added. The amount of initiator may be between 0.01% by weight (based on the fluoropolymer solids to be produced) and 1% by weight. In one embodiment, the amount of initiator is between 0.05 and 0.5% by weight. In another embodiment, the amount may be between 0.05 and 0.3% by weight.

The aqueous emulsion polymerization system may further comprise other materials, such as buffers and, if desired, complex-formers or chain-transfer agents. Examples of chain transfer agents that can be used include dimethyl ether, methyl t-butyl ether, alkanes having 1 to 5 carbon atoms such as ethane, propane and n-pentane, halogenated hydrocarbons such as $CCl_4$, $CHCl_3$ and $CH_2Cl_2$ and hydrofluorocarbon compounds such as $CH_2F$—$CF_3$ (R134a).

Examples of fluorinated monomers that may be polymerized using the perfluoro ether surfactant as an emulsifier include partially or fully fluorinated gaseous monomers including fluorinated olefins such as tetrafluoroethylene, chlorotrifluoroethylene, hexafluoropropylene, vinyl fluoride, vinylidene fluoride, partially or fully fluorinated allyl ethers and partially or fully fluorinated vinyl ethers. The polymerization may further involve non-fluorinated monomers such as ethylene and propylene.

Further examples of fluorinated monomers that may be used in the aqueous emulsion polymerization according to the invention include those corresponding to the formula:

  (II)

wherein $R_f$ represents a perfluorinated aliphatic group that may contain one or more oxygen atoms. Preferably, the perfluorovinyl ethers correspond to the general formula:

  (III)

wherein $R_f$ and $R'_f$ are different linear or branched perfluoroalkylene groups of 2-6 carbon atoms, m and n are independently 0-10, and $R''_f$ is a perfluoroalkyl group of 1-6 carbon atoms. Examples of perfluorovinyl ethers according to the above formulas include perfluoro-2-propoxypropylvinyl ether (PPVE-2), perfluoro-3-methoxy-n-propylvinyl ether, perfluoro-2-methoxy-ethylvinyl ether, perfluoromethylvinyl ether (PMVE), perfluoro-n-propylvinyl ether (PPVE-1) and

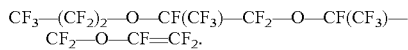

Still further, the polymerization may involve comonomers that have a functional group such as for example a group capable of participating in a peroxide cure reaction. Such functional groups include halogens such as Br or I as well as nitrile groups. Specific examples of such comonomers that may be listed here include (a) bromo- or iodo-(per)fluoroalkyl-(per)fluorovinylethers having the formula:

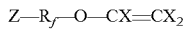

wherein each X may be the same or different and represents H or F, Z is Br or I, $R_f$ is a (per)fluoroalkylene $C_1$-$C_{12}$, optionally containing chlorine and/or ether oxygen atoms; for example: $BrCF_2$—O—CF=$CF_2$, $BrCF_2CF_2$—O—CF=$CF_2$, $BrCF_2CF_2CF_2$—O—CF=$CF_2$, $CF_3CFBrCF_2$—O—CF=$CF_2$, and the like; and (b) bromo- or iodo containing fluoroolefins such as those having the formula:

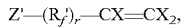

wherein each X independently represents H or F, Z' is Br or I, $R'_f$ is a perfluoroalkylene $C_1$-$C_{12}$, optionally containing chlorine atoms and r is 0 or 1; for instance: bromotrifluoroethylene, 4-bromo-perfluorobutene-1, and the like; or bromofluoroolefins such as 1-bromo-2,2-difluoroethylene and 4-bromo-3,3,4,4-tetrafluorobutene-1.

Examples of nitrile containing monomers that may be used include those that correspond to one of the following formulas:

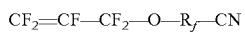

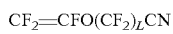

wherein L represents an integer of 2 to 12; g represents an integer of 0 to 4; k represents 1 or 2; v represents an integer of 0 to 6; u represents an integer of 1 to 6, $R_f$ is a perfluoroalkylene or a bivalent perfluoro ether group. Specific examples of nitrile containing liquid fluorinated monomers include perfluoro(8-cyano-5-methyl-3,6-dioxa-1-octene), $CF_2=CFO(CF_2)_5CN$, and $CF_2=CFO(CF_2)_3OCF(CF_3)CN$.

The aqueous emulsion polymerization may be used to produce a variety of fluoropolymers including perfluoropolymers, which have a fully fluorinated backbone, as well as partially fluorinated fluoropolymers. Also the aqueous emulsion polymerization may result in melt-processable fluoropolymers as well as those that are not melt-processable such as for example polytetrafluoroethylene and so-called modified polytetrafluoroethylene. The polymerization process can further yield fluoropolymers that can be cured to make fluoroelastomers as well as fluorothermoplasts. Fluorothermoplasts are generally fluoropolymers that have a distinct and well noticeable melting point, typically in the range of 60 to 340° C. or between 100 and 320° C. They thus have a substantial crystalline phase. Fluoropolymers that are used for making fluoroelastomers typically are amorphous and/or have a neglectable amount of crystallinity such that no or hardly any melting point is discernable for these fluoropolymers.

The aqueous emulsion polymerization results in a dispersion of the fluoropolymer in water. Generally the amount of solids of the fluoropolymer in the dispersion directly resulting from the polymerization will vary between 3% by weight and about 40% by weight depending on the polymerization conditions. A typical range is between 5 and 30% by weight. The particle size (volume average particle size) of the fluoropolymer is typically between 50 nm and 350 nm with a typical particle size being between 100 nm and about 300 nm. The amount of perfluoro ether of formula (I) in the resulting dispersion is typically between 0.001 and 5% by weight based on the amount of fluoropolymer solids in the dispersion. A typical amount may be from 0.01 to 2% by weight or from 0.02 to 1% by weight.

The fluoropolymer may be isolated from the dispersion by coagulation if a polymer in solid form is desired. Also, depending on the requirements of the application in which the fluoropolymer is to be used, the fluoropolymer may be post-fluorinated so as to convert any thermally unstable end groups into stable $CF_3$ end groups. The fluoropolymer may be post-fluorinated as described in for example EP 222945. Generally, the fluoropolymer will be post fluorinated such that the amount of end groups in the fluoropolymer other than $CF_3$ is less than 80 per million carbon atoms.

For coating applications, an aqueous dispersion of the fluoropolymer is desired and hence the fluoropolymer will not need to be separated or coagulated from the dispersion. To obtain a fluoropolymer dispersion suitable for use in coating applications such as for example in the impregnation of fabrics or in the coating of metal substrates to make for example cookware, it will generally be desired to add further stabilizing surfactants and/or to further increase the fluoropolymer solids. For example, non-ionic stabilizing surfactants may be added to the fluoropolymer dispersion. Typically these will be added thereto in an amount of 1 to 12% by weight based on fluoropolymer solids. Examples of non-ionic surfactants that may be added include $$R^1-O-[CH_2CH_2O]_n-[R^2O]_m-R^3 \quad (IV)$$

wherein $R^1$ represents an aromatic or aliphatic linear or branched hydrocarbon group having at least 8 carbon atoms, $R^2$ represents an alkylene having 3 carbon atoms, $R^3$ represents hydrogen or a $C_1$-$C_3$ alkyl group, n has a value of 0 to 40, m has a value of 0 to 40 and the sum of n+m being at least 2. It will be understood that in the above formula (IV), the units indexed by n and m may appear as blocks or they may be present in an alternating or random configuration. Examples of non-ionic surfactants according to formula (IV) above include alkylphenol oxy ethylates such as ethoxylated p-isooctylphenol commercially available under the brand name TRITON™ such as for example TRITON™ X 100 wherein the number of ethoxy units is about 10 or TRITON™ X 114 wherein the number of ethoxy units is about 7 to 8. Still further examples include those in which $R^1$ in the above formula (IV) represents an alkyl group of 4 to 20 carbon atoms, m is 0 and $R^3$ is hydrogen. An example thereof includes isotridecanol ethoxylated with about 8 ethoxy groups and which is commercially available as GENAPOL®X080 from Clariant GmbH. Non-ionic surfactants according to formula (IV) in which the hydrophilic part comprises a block-copolymer of ethoxy groups and propoxy groups may be used as well. Such non-ionic surfactants are commercially available from Clariant GmbH under the trade designation GENAPOL® PF 40 and GENAPOL® PF 80.

The amount of fluoropolymer solids in the dispersion may be upconcentrated as needed or desired to an amount between 30 and 70% by weight. Any of the known upconcentration techniques may be used including ultrafiltration and thermal upconcentration.

The obtained fluoropolymer dispersion may be conveniently used in most applications optionally after the addition of non-ionic surfactant and/or upconcentration and without removing the perfluoro ether surfactant.

EXAMPLES

Test Methods

Particle Size Determination

The latex particle size determination was conducted by means of dynamic light scattering with a Malvern Zetazizer 1000 HSA in accordance to ISO/DIS 13321. Prior to the measurements, the polymer latexes as yielded from the polymerisations were diluted with 0.001 mol/L KCl-solution, the measurement temperature was 25° C. in all cases. The reported average in nm is the Z-average particle diameter.

SSG

Polymer Density was measured according to ASTM 4894-4

Solid Content: Determination of solid content was done by subjecting the latex sample to a temperature up to 250° C. for 30 min.

Perfluoro Ether Emulsifiers Used:

| | |
|---|---|
| $CF_3-O-CF_2-CF_2-COONH_4$ | Compound 1 |
| $C_2F_5-O-CF_2-CF_2-COONH_4$ | Compound 2 |
| $C_3F_7-O-CF_2-CF_2-COONH_4$ | Compound 3 |
| $C_4F_9-O-CF_2-CF_2-COONH_4$ | Compound 4 |

Preparation of Compound 1

$CH_3-O-CF_2-CF_2-COOCH_3$ was fluorinated as described in WO 01/46116; the acid fluoride $CF_3-O-CF_2-CF_2-COF$ was then converted into the methylester. The distilled ester was converted into the ammonia-salt by saponification with aqueous ammonia and subsequent removal of methanol by distillation.

Preparation of Compounds 2, 3 and 4

Compounds 2, 3 and 4 were prepared from the corresponding carboxylic acid fluorides (~COF) [purchased from Exfluor, Round Rock, Tex., USA]. The acid fluorides were converted by addition of methanol to the methylester. The distillated methylester were saponified with aqueous ammonia at 60-80° C. and methanol is removed by distillation.

EXAMPLES

Example 1 and Comparative Example C-1

In example 1 fluorinated monomers were polymerized in the presence of Compound 1 as emulsifier. Comparative example C-1 was made in the same way, but using $C_7F_{15}COONH_4$ as emulsifier.

The polymerization experiments were performed in a 40 L autoclave equipped with an impeller agitator and a baffle. The autoclave was evacuated and than charged with 33 l of deionized water and set to 35° C. Agitation was started at 160 rpm and in three following cycles, the vessel was evacuated and subsequently charged with nitrogen to assure that all oxygen had been removed. Another cleaning cycle was performed using TFE. After pressurizing to 0.2 MPa the TFE was released and the reactor was evacuated again. Then the fluorinated emulsifier as specified in table 1 was added and the following materials were added in aqueous solution: 24 mg of copper sulfate penta hydrate, 0.6 mg of sulphuric acid and 8 g of a 25 weight % aqueous ammonia solution and 5.6 g of PPVE-2. Finally the reactor was pressurized with TFE to 0.2 MPa and 50 g of HFP were added. The reactor was then set to 1.5 MPa using TFE and 100 ml of an aqueous initiator solution containing 187 mg of sodium sulfite and 100 ml of an aqueous initiator solution containing 429 mg of ammonium peroxodisulfate was pumped into the vessel. The beginning of the polymerization was indicated by a pressure drop. During polymerization the pressure was maintained at 1.5 MPa by feeding TFE into the gas phase. After feeding an amount as indicated in table 1 of TFE into the reactor, the monomer valve was closed. The characteristics of the obtained polymer dispersion are summarized in table 1.

1000 ml of the obtained polymer dispersion was coagulated by adding 20 ml of hydrochloric acid under agitation. When coagulation was performed 100 ml of gasoline were added and stirred again. After dewatering, the coagulated product was washed several times with deionized water. The gasoline was removed by heating the dewatered product in vacuum to 40° C. The polymer was dried overnight at 100° C. in a vacuum oven. Test data are given in table 1.

Examples 2 to 5

For examples 2 to 5, the polymerization experiments were performed in a 40 l kettle equipped with an impeller agitator and a baffle. The kettle was charged with 30 l of deionized water and set to 35° C.; the kettle was evacuated repeatedly to remove oxygen. Agitation speed was set to 165 rpm. The oxygen free kettle was charged with 70 mmol fluorinated emulsifier (unless specified differently) as listed in table 1 and the following materials were added: 0.5 ml of a solution containing 40 mg of copper sulphate penta hydrate and 1 mg of conc. sulphuric acid; 15 g of a 25 w-% of aqueous ammonia solution and 5.6 g of $CF_3CF_2CF_2$—O—$CF(CF_3)$—$CF_2$—O—$CF=CF_2$ (PPVE-2). Finally the reactor was pressurized with tetrafluoroethylene (TFE) to 0.2 MPa and 47 g of hexafluoropropylene (HFP) were added. The kettle was then set to 1.5 MPa using TFE and 100 ml of an aqueous initiator solution containing 140 mg of sodium disulfite followed by 100 ml of a solution containing 340 mg of ammonium peroxodisulfate was pumped into the reactor. The beginning of the polymerization was indicated by a pressure drop. During polymerization the pressure was maintained at 1.5 MPa by feeding TFE continuously. After 3.2 kg of TFE had been added, the monomer valve was closed and the pressure was released. The characteristics of the obtained polymer latices are summarized in table 1.

1000 ml of this polymer dispersion were coagulated by adding 20 ml hydrochloric acid under agitation. The coagulated material was agglomerated with gasoline and washed repeatedly. The agglomerated polymer was dried overnight at 200° C. in a vacuum oven; test data are given in table 1.

TABLE 1

Characteristics of fluoropolymers

| | Comparative Example | Ex 1 | Ex 2 | Ex 3 | Ex 4 | Ex 5 |
|---|---|---|---|---|---|---|
| Emulsifier | $C_7F_{15}COONH_4$ | 1 | 1 | 2 | 3 | 4 |
| (Amount) | 140 mmol | 210 mmol | 70 mmol | 140 mmol | 70 mmol | 70 mmol |
| Total TFE Addition | 3.64 kg | 2.55 kg | 3.2 kg | 3.2 kg | 3.2 kg | 3.2 kg |
| Polymerization Time (min.) | 75 | 84 | 84 | 73 | 79 | 72 |
| Average Particle Size (nm) | 120 | 122 | 122 | 129 | 115 | 113 |
| Solid Content (%) | 10.2 | 7.1 | 7.1 | 10.1 | 10.0 | 10.2 |
| SSG (g/cm³) | 2.171 | 2.166 | 2.175 | 2.159 | 2.167 | 2.165 |

Determination of Bio-Accumulation

The perfluoro ether carboxylates were evaluated for urinary clearance using a pharmacokinetic study in rats. The goal was to measure the total amount of parent compound eliminated via urinary output and estimate the rate of elimination. The study was approved by the IACUC (Institutional Animal Care and Use Committees) and was performed in 3M Company's AAALAC (Association for Assessment and Accreditation of Laboratory Animal Care)—accredited facility.

The study utilized male Sprague Dawley rats, 6 to 8 weeks of age, and approximately 200 to 250 g body weight at study onset. The test compounds of table 2 were administered at a dose of 73 micro Moles per kg body weight in rats (N=3 animals per tested compound). All test compounds were prepared in sterile deionized water and given to rats via oral gavage. After test compounds administration, the rats were housed individually in metabolism cages for urine collection: 0 to 6 hours, 6 to 24 hours, 24 to 48 hours and 72 to 96 hours. Animals we observed throughout the study for clinical signs of toxicity. Gross necropsy was performed at the termination of each study (96 hours post-dose) with sera and liver samples being retained from each animal.

The concentration of the parent compound or metabolites thereof were quantitatively measured via fluorine NMR on each urine sample for each animal at each time point based on internally added standards.

The bioaccumulation data obtained in accordance with the above test are reported in table 2 below.

TABLE 2

|  | $T\frac{1}{2}$ (h) | % Recovery (96 h) | Compound-related Effects |
|---|---|---|---|
| C-1 | ~550 | 6 | Hepatomegaly |
| Compound 1 | 11 | 100 | — |
| Compound 2 | 10 | 100 | — |
| Compound 3 | 12 | 82 | — |
| Compound 4 | 31 | 42 | Hepatomegaly |

$T_{1/2}$ is the renal half-life and is the time required for the amount of a particular substance in a biological system to be reduced to one half of its value by biological processes when the rate of removal is approximately exponential. In these examples the value of $T_{1/2}$ is calculated by exponential least squares curve fitting ($y=Ae^{Bx}$ and $T_{1/2}=0.693/B$) where y represents the concentration of analyte in urine and x represents time in hours.

The invention claimed is:

1. Method for making a fluoropolymer comprising polymerizing in an aqueous emulsion one or more fluorinated monomers in the presence of a perfluoro ether as an emulsifier, the perfluoro ether corresponding to formula (I):

$$R_f\text{—}O\text{—}CF_2CF_2\text{—}X \qquad (I)$$

wherein $R_f$ represents a linear or branched perfluoroalkyl group having 1 or 2 carbon atoms and X represents a carboxylic acid group or salt thereof.

2. Method according to claim 1 wherein the one or more fluorinated monomers comprise one or more gaseous fluorinated monomers.

3. Method according to claim 1 wherein the one or more fluorinated monomers comprise perfluorinated monomers.

4. Method according to claim 1 wherein the polymerization is carried out in the presence of a fluorinated liquid and wherein the fluorinated liquid is emulsified using the perfluoro ether as an emulsifier.

5. Method according to claim 1 wherein the polymerization is carried out using the perfluoro ether as the only emulsifier.

6. Method according to claim 1 wherein the amount of the perfluoro ether is between 0.01 and 5% by weight based on the amount of water in the polymerization.

7. Aqueous dispersion comprising a fluoropolymer and a perfluoro ether corresponding to formula (I):

$$R_f\text{—}O\text{—}CF_2CF_2\text{—}X \qquad (I)$$

wherein $R_f$ represents a linear or branched perfluoroalkyl group having 1 or 2 carbon atoms and X represents a carboxylic acid group or salt thereof.

8. Aqueous dispersion according to claim 7 wherein the dispersion is free of perfluoroalkanoic acids or salts thereof.

9. Aqueous dispersion according to claim 7 wherein the amount of the perfluoro ether is between 0.001 and 5% by weight based on the fluoropolymer solids.

10. Aqueous dispersion according to claim 7 wherein the amount of fluoropolymer solids is between 10 and 30% by weight.

11. Aqueous dispersion according to claim 7 wherein the amount of fluoropolymer solids is more than 30 and up to 70% by weight.

12. Aqueous dispersion according to claim 7 wherein the dispersion further comprises a non-ionic surfactant.

13. A method comprising coating or impregnating a substrate with an aqueous dispersion as defined in claim 7.

* * * * *